(12) United States Patent
Cleary et al.

(10) Patent No.: US 10,101,212 B1
(45) Date of Patent: Oct. 16, 2018

(54) WAVELENGTH-SELECTIVE THERMAL DETECTION APPARATUS AND METHODS

(71) Applicant: The United States of America as represented by the Secretary of the Air Force, Washington, DC (US)

(72) Inventors: Justin W Cleary, Miamisburg, OH (US); Robert E Peale, Winter Park, FL (US); Evan Smith, Dayton, OH (US); Janardan Nath, Orlando, FL (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 66 days.

(21) Appl. No.: 15/457,442

(22) Filed: Mar. 13, 2017

(51) Int. Cl.
  *G01J 5/10* (2006.01)
  *G01J 5/02* (2006.01)
(52) U.S. Cl.
  CPC .. *G01J 5/10* (2013.01); *G01J 5/02* (2013.01)
(58) Field of Classification Search
  CPC ...................................... G01J 5/10; G01J 5/02
  See application file for complete search history.

(56) References Cited

U.S. PATENT DOCUMENTS

| 7,750,301 | B1* | 7/2010 | Woolaway | G01J 5/02 250/339.09 |
| 8,629,398 | B2* | 1/2014 | Talghader | G01J 5/02 250/338.4 |
| 8,643,532 | B1* | 2/2014 | Puscasu | H01Q 15/0066 342/1 |
| 9,733,180 | B2* | 8/2017 | Boutami | G01N 21/3504 |
| 2011/0304005 | A1* | 12/2011 | Brueckl | G01J 5/08 257/467 |
| 2012/0235038 | A1* | 9/2012 | Nishikawa | G01J 5/0014 250/338.3 |

(Continued)

OTHER PUBLICATIONS

S.-W. Han and D. P. Neikirk, "Design of infrared wavelength-selective microbolometers using planar multimode detectors," presented at Proceedings of the SPIE vol. 5836 Smart Sensors, Actuators, and MEMS II, Microtechnologies for the New Millennium 2005, Seville, Spain, May 9-11, 2005, pp. 549-557.*

(Continued)

*Primary Examiner* — Marcus Taningco
*Assistant Examiner* — Djura Malevic
(74) *Attorney, Agent, or Firm* — AFMCLO/JAZ; Jason Sopko

(57) ABSTRACT

A wavelength selective bolometer includes a substrate configured to serve as a foundation for the apparatus and a thermal isolation gap established between the substrate and subsequent solid material layers. A conducting ground plane layer is disposed above the thermal isolation gap, and a first dielectric layer is mated to a top surface of the conducting ground plane. A temperature sensing material layer is mated to a top surface of the first dielectric layer, and a plurality of interconnects is placed in electrical communication with the temperature sensing material layer. A second dielectric layer is mated to a top surface of the temperature sensing material, and at least one conductive element is mated to a top surface of the second dielectric layer. The dimensions of the conductive element and other variables are chosen to achieve resonant absorption of selected wavelengths of radiation incident thereupon.

13 Claims, 3 Drawing Sheets

(56) References Cited

U.S. PATENT DOCUMENTS

2014/0111844 A1* 4/2014 Puscasu ............. H01Q 15/0066
                                                           359/245
2017/0309758 A1* 10/2017 Frey .......................... G01J 3/26
2017/0336695 A1* 11/2017 Puscasu .................... G02F 1/19

OTHER PUBLICATIONS

Nath, Infra-Red Spectral Microscopy of Standing-Wave Resonances in Single Metal-Dielectric-Metal Thin-Film Cavity, Proc. SPIE 95442M, 2015.

Jung, Wavelength-Selective Infrared Metasurface Absorber for Multispectral Thermal Detection, IEEE Photonics Journal 7, 6804210, 2015.

* cited by examiner

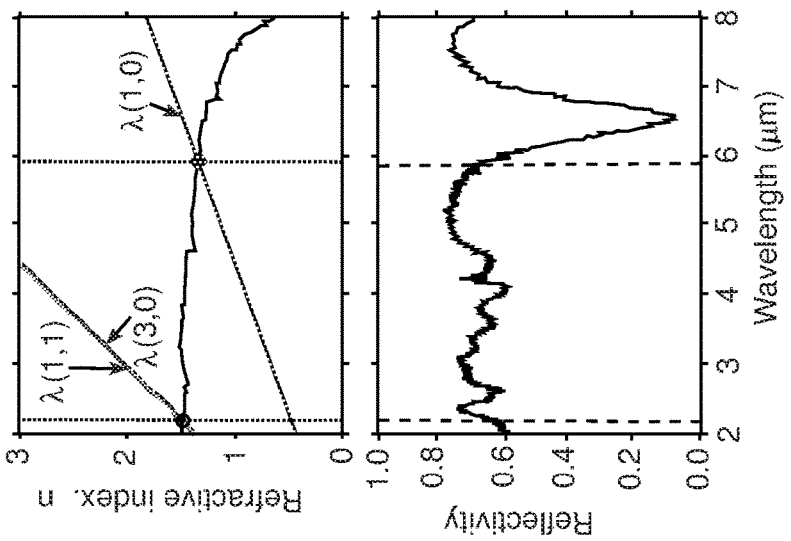
FIG. 3C
FIG. 3D
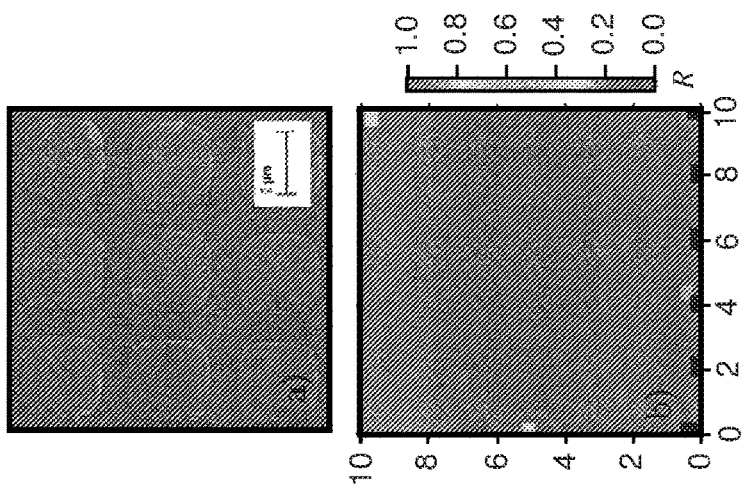
FIG. 3A
FIG. 3B

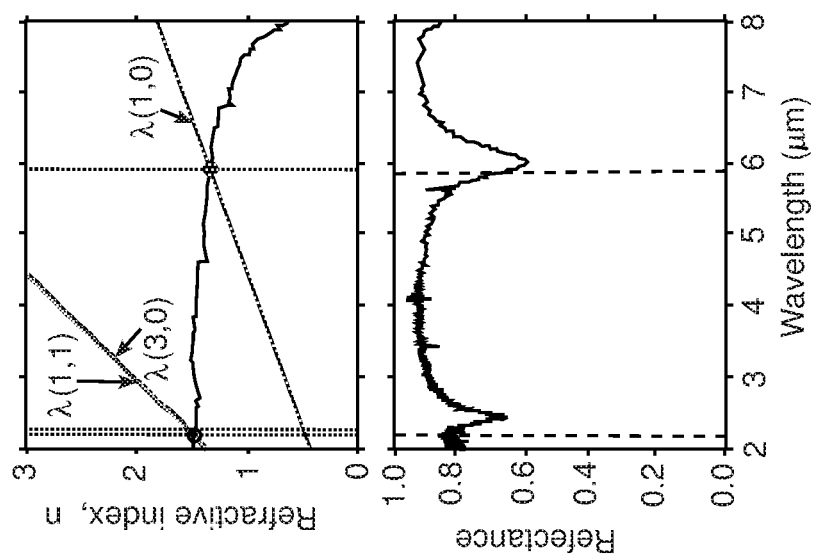
FIG. 4C
FIG. 4D
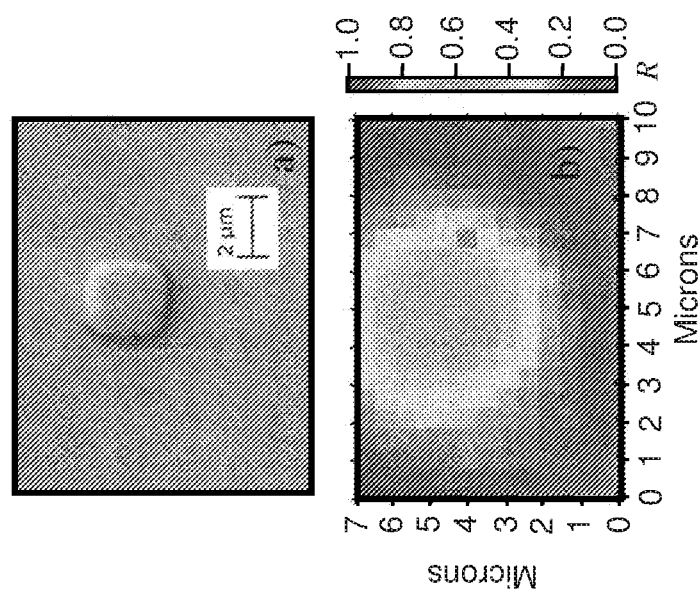
FIG. 4A
FIG. 4B

WAVELENGTH-SELECTIVE THERMAL DETECTION APPARATUS AND METHODS

RIGHTS OF THE GOVERNMENT

The invention described herein may be manufactured and used by or for the Government of the United States for all governmental purposes without the payment of any royalty.

FIELD OF THE INVENTION

The present invention relates generally to optical detectors and, more particularly, to bolometers having configurable wavelength selectivity.

BACKGROUND OF THE INVENTION

While optical detectors and imaging devices may be configured to operate within widely varying wavelengths of interest, the discussion that follows will focus upon Mid-Wave Infrared (MWIR) and Long-Wave Infrared (LWIR) spectral bands.

Bolometers transduce an increase in temperature into a change in resistivity. Materials with high temperature coefficients of resistivity such as amorphous silicon and vanadium dioxide may be used as the detector elements in microbolometers.

Available variants for high optical absorption may include applied coatings of infrared (IR) absorbing material having high intrinsic loss, resonance cavities, and metamaterial or surface plasmon based absorbers. There are several materials with intrinsic loss that strongly absorb electromagnetic radiation over large band-widths such as graphite, metal-black, and carbon nanotubes. However, thicknesses in the 10-100 μm range are typically required for those materials to achieve strong absorption in the longer IR regions. Such thick films have disadvantages to include difficulty in patterning, low thermal and mechanical stability, and reduction of absorption over time. Also, these materials are not design tunable.

The Fabry-Perot type of cavity is popular in thermal detectors. However, absorption bands from Fabry-Perot type of resonance cavities are highly angle dependent and the quality factor of such resonators can be difficult to control in manufacturing. Metamaterial or surface plasmon based absorbers, with the names being exchanged in the literature rather loosely, usually consist of thin layers of metal-dielectric-metal and have been reported to produce polarization insensitive strong absorption over wide angles. Typically, such absorbers consist of a periodic metallic squares, a dielectric spacer layer and a metal ground plane, that is, it has a metal-dielectric-metal (MDM) structure. The resonance frequency band is only several hundred nanometers wide, depending on the size and periodicity of the surface structures, and thickness and refractive index of the dielectric.

Current infrared imaging array detectors employ relatively crude wavelength selection techniques by being designed to match broad atmospheric transparency windows. These are the MWIR and LWIR bands, corresponding to 3-5 and 7-12 μm wavelengths, respectively. The MWIR band is of interest for imaging relatively hot targets, such as engines and rocket plumes. The LWIR band is valuable for night-vision and imaging of targets such as humans, animals, and other structures having a temperature that is slightly elevated above ambient air temperature.

Common existing-technology uncooled LWIR detectors include a VOx microbolometer with 17 μm pitch, 30 mK NETD (noise-equivalent temperature difference), and a 10 ms response time. The D* value is well into the $10^9$ cm√Hz/W range. Premium commercially-available detectors comprise a 12 μm pitch with a 40 mK NETD and 10 ms response time. Inexpensive (~$250) low-resolution, wafer-level-packaged FPAs are available as commercial off the shelf solutions.

At the other end of the performance spectrum, expensive high-definition cameras are available. Their costs are mainly driven by the large and fast optics rather than by the FPA (focal plane array). Achieved absorptance is near unity for such microbolometers across the LWIR band, and speed-responsivity trade-off is nearly optimized. Over the next few years, further pitch reduction is expected, to 10 or 12 μm, and NETD may be reduced to 10 mK using doped-polycrystalline $VO_2$. This will likely result in detectors that are nearly thermal-fluctuation-noise limited, as opposed to the present state of the art wherein Johnson noise dominates.

At that point, the detectors will have reached fundamental theoretical limits for microbolometers ($D^* \sim 10^9$-$10^{10}$ cm√Hz/W), and additional research and development dedicated to improving standard figures of merit are expected to yield strongly diminished returns.

Microbolometers, in their current form, have sufficient sensitivity for general imaging applications. However, they cannot be used for spectral sensing, where narrow-band wavelength selectivity is integrated directly into the detector. This yields a non-trivial limitation when applied to certain target-identification tasks. For example, it is possible to distinguish targets based on subtle differences in its emissivity spectrum, which can arise due to the effects of sharp molecular absorption features. It may be possible to remotely ascertain the identity of certain factory waste gases by analyzing the spectral emission therefrom. To perform such spectral discrimination now, using current-technology bolometers, would require considerable fore-optics and spectroscopic instrumentation, such as gratings or interferometers.

Accordingly, there is an unmet need in the art for improved wavelength-selective MWIR and LWIR detectors and related methods.

SUMMARY OF THE INVENTION

The present invention overcomes the foregoing problems and other shortcomings, drawbacks, and challenges of enhancing wavelength-selectivity in MWIR and LWIR detectors. While the invention will be described in connection with certain embodiments, it will be understood that the invention is not limited to these embodiments. To the contrary, this invention includes all alternatives, modifications, and equivalents as may be included within the spirit and scope of the present invention.

According to one embodiment of the present invention, a wavelength selective bolometer apparatus is provided. The apparatus includes a substrate configured to serve as a foundation for the apparatus and a thermal isolation gap established between the substrate and subsequent solid material layers. A conducting ground plane layer is disposed above the thermal isolation gap, and a first dielectric layer is mated to a top surface of the conducting ground plane. A temperature sensing material layer is mated to a top surface of the first dielectric layer, and a plurality of interconnects is placed in electrical communication with the temperature sensing material layer. The interconnects extend beyond a perimeter of the first dielectric layer. A second dielectric layer is mated to a top surface of the temperature sensing material, and at least one conductive element is mated to a top surface of the second dielectric layer. The dimensions of the conductive element and a combined thickness of the first dielectric layer, the temperature sensing material layer, and the second dielectric layer are chosen to achieve resonant absorption of selected wavelengths of radiation incident thereupon.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

FIGS. 3A through 3D depict IR micro spectroscopy imaging data associated with a square array in accordance with embodiments of the disclosed invention.

FIGS. 4A through 4D depict IR micro spectroscopy imaging data associated with a discrete unit cell, in accordance with embodiments of the disclosed invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

Embodiments of the disclosed invention include a bolometer incorporating selective absorbers to discriminately detect individual wavelengths within the Mid-Wave Infrared (MWIR) and Long-Wave Infrared (LWIR) spectral bands. The wavelength selective bolometer described herein features integration of selective absorbers with $VO_x$ bolometers. The specific absorbers disclosed may include resonators, in which sharp strong absorption bands are created at design-tunable wavelengths using subwavelength conductive and dielectric structures. The specific thermal infrared detectors may include air-bridge microbolometers fabricated from semiconducting vanadium oxide $VO_x$, which has a high temperature coefficient of resistance (TCR). Embodiments of the disclosed wide-band absorption detector may use efficient MDM structures with surface structures of squares that need not be periodic. The absorption band is also weakly dependent on polarization and angle of incidence.

The disclosed invention integrates conductive absorbers with air-bridge microbolometers, and utilizes such conductive absorbers as an integrated, wavelength selective mechanism for such air-bridge microbolometers. The invention further utilizes arrays of conductive selective absorbers integrated into air-bridge microbolometers for spectrally selective imaging and detection applications.

Figure 1:
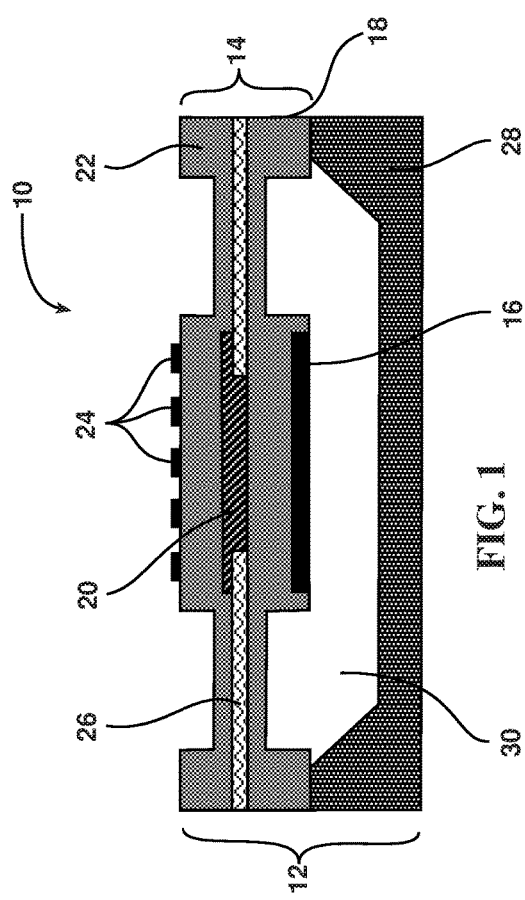
FIG. 1 is a schematic view of an air-bridge bolometer having a selective absorber, according to embodiments of the disclosed invention.

Turning attention to FIG. 1, a schematic of a detector apparatus 10 having an air-bridge bolometer 12 with a cooperating selective absorber 14 is shown. The selective absorber 14 includes a continuous conductive ground plane layer 16, a first dielectric layer 18 configured to provide electrical isolation from the ground plane layer 14, a high TCR material layer 20 (for example, a thick semiconducting $VO_x$ film), a second dielectric layer 22 to encapsulate and insulate the high TCR material layer, and finally an array of conductive elements 24 (depicted in this embodiment as an array of squares). It should be noted that in this illustrative embodiment, the high TCR material layer 20 is acting as a temperature sensing material layer of the apparatus 10 (wherein the resistance of the temperature sensing material varies its resistance in response to changes in temperature). A temperature sensing material layer may include additional sub-layers, to include other High TCR materials, dielectrics, or the like.

Connected laterally to the high TCR material layer 20 are metal interconnects 26 for electrical measurement of resistance. The interconnects 26 provide an electrical connection between the temperature dependent variable resistance high TCR material, and the outside environment. That is, the interconnects are connected to the high TCR material, extend past the outer edge, or perimeter, of the first and second dielectric layers 18,22, and terminate to the environment outside of the apparatus 10. The above structure (particularly, the bottom side of the first dielectric layer 18) is separated from the substrate 28 by a thermal isolation gap 30. In describing the construction of the bolometer apparatus 10, it can be said that the thermal isolation gap is established between the substrate 28 and subsequent solid material layers (ground plane layer 16, first dielectric layer 18, etc.), This thermal isolation gap can be called by the more common term "air gap" as is a defining component in "air-bridge" structures as it is referred to commonly in the literature and elsewhere here. The thermal isolation gap or "air gap" in practice may be comprised of air or evacuated to achieve low pressure.

The array of conductive elements 24 is not limited to periodic square shapes. For example, acceptable results may be achieved with patterns that are non-periodic, or patterns that include a given row being offset horizontally or vertically from a previous row. Further, the conductive elements may be of differing geometries, or may be established as a negative pattern of geometries (holes in an otherwise contiguous conductive sheet). However, it has been observed that a square configuration provides excellent results, since near complete absorption can be achieved (FIGS. 3A-3D).

Suitable materials for the conductive ground plane layer 16, first dielectric layer 18, high TCR material layer 20, second dielectric layer 22, conductive elements 24, interconnects 26, and substrate 28 include, by way of example, the following: The first and second dielectric layers 18 and 22 may comprise silicon dioxide. In the alternative, they may include other suitable dielectrics that provide thermal isolation with low conductivity, to include silicon nitride, titanium dioxide or other acceptable dielectrics known to one of ordinary skill in the art. Likewise, the ground plane layer 16 and conductive elements 24 may be fabricated from traditional metals to include, gold, silver, aluminum, titanium, copper, or the like. In the alternative, they may be fabricated from metal silicides, metal germanides, semimetals, semiconductors, conducting oxides, or conducting polymers. The high TCR material layer (or the temperature sensing layer that includes a high TCR material) may comprise $VO_x$, where x has a value between 1 and 2. In alternative, the high TCR material may be comprised of mixtures of $VO_x$ with other materials such as metallic nano-particles, or may be amorphous silicon. It is further noted that the substrate 28 is not required to be silicon. It may be substituted for alternate materials, such as glass, that enable the deposition or growth of bolometer detector 10 features thereon. Additionally, using silicon for the substrate has the benefit of potential integration with silicon based electronics which is an industry standard.

Figure 2:
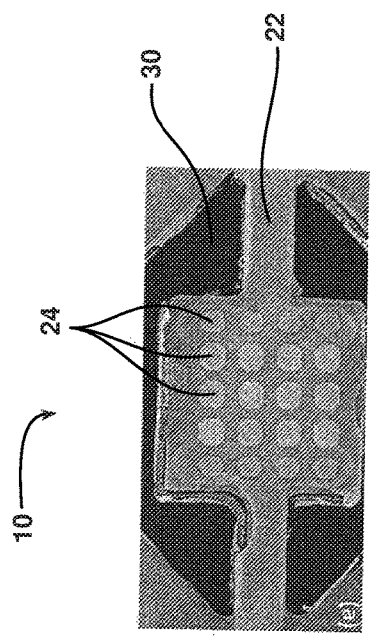
FIG. 2 depicts an embodiment of the disclosed invention including absorptive structures disposed on active elements of a $VO_x$ air-bridge microbolometer.

FIG. 2 shows a scanning electron microscope image of an inventive detector 10 having conductive elements 24 serving as absorbing structures on active elements of an exemplary $VO_x$ air-bridge microbolometer.

The spectrally selective detector 10 includes conductive elements 24, which may be squares, arranged on the second dielectric 22, wherein all dimensions are of the conductive elements 24 are sub-wavelength.

One advantage of the structure disclosed in FIG. 1 is that their operational wavelength is design tunable. For a given small dielectric thickness, the resonant wavelength is roughly proportional to the dimension of a conductive square. An analytic design formula for the conductive element 24 selective absorbers that agrees well with observations in the very long wave-IR (50 μm wavelength) is $$\lambda(b, m) = \frac{2(b+1)n(\lambda)}{b+2m}\sqrt{t^2 + l^2/(b+1)^2} \qquad (1)$$

where λ is the wavelength, t the dielectric thickness, l the square dimension, n the dielectric refractive index, b the odd number of reflections from the metal surfaces, and m=0, 1, 2, . . . . Due to dispersion in n(λ), Eq. 1 needs to be solved graphically or numerically using experimental index spectra obtained by infrared ellipsometry or other similar measurements.

Eq. 1 is less successful at predicting the observed resonance wavelengths in the MWIR and LWIR bands, with predicted wavelengths differing from observations by 10%. However, Eq. 1 remains a useful guide, even when there is strong dispersion in the dielectric refractive index, such as occurs near 9 μm wavelength for $SiO_2$. This approach is preferable over the commonly used numerical simulations, since simulations are very time consuming and expensive as compared to calculations by analytic design formulas.

The following examples illustrate particular properties and advantages of some of the embodiments of the present invention. Furthermore, these are examples of reduction to practice of the present invention and confirmation that the principles described in the present invention are therefore valid but should not be construed as in any way limiting the scope of the invention.

FIG. 3A-3D illustrate examples of resonant spectrally-selective wavelengths determined using Eq. 1 for specific materials and size parameters. In this structure, the dielectric thickness (chosen here to be silicon dioxide), t, is 0.1 μm and square dimension (gold in this case), l, is 2.2 μm as can be seen in FIG. 3A (scanning electron microscope or SEM image). FIG. 3B then presents an IR image at 6.6 μm wavelength with the same field of view as FIG. 3A which indicates nearly uniform near perfect absorption across the array. FIG. 3C presents the wavelength-dependent index, n(λ), of silicon dioxide. This index is used in Eq. 1 to determine that the resonance wavelength for the λ(1,0) mode is approximately 5.9 μm. Higher order modes can also be found for both the λ(3,0) and λ(1,1) resonance wavelength of approximately of 2.2 μm. FIG. 3D presents the reflectivity spectrum from one pixel where the dashed vertical lines again represent the theoretically calculated resonances. A 93% deep λ(1,0) fundamental absorption appears at 6.7 μm wavelength. As noted earlier, calculated resonant wavelengths are slightly smaller than experimental observed resonant wavelengths but the analytic model summarized by Eq. 1 gives a rapid and reasonably accurate approximation.

With regard to the above example (FIG. 3A-3D), we now confirm that this absorber is period-independent, i.e. not a "metamaterial" or surface plasmon as discussed earlier. As known by someone skilled in the art, period-dependent resonant or absorption features shift in wavelength with respect to a changing spatial period.

A single square was fabricated using similar methods to those above, but with t of 0.1 μm and gold square dimension having l of 2.1 μm (This is slightly smaller than FIG. 3A). FIGS. 4A-4D depict micro-spectroscopy imaging data of the single isolated unit cell. FIG. 4A illustrates a SEM image of a surface square. FIG. 4B shows an IR image of the same single square at 6.3 μm wavelength. FIG. 4C depicts the graphical solution of resonant wavelengths for λ (1,0), λ (3,0) and λ (1,1) according to Eq. 1. Lastly, FIG. 4D depicts the reflectance spectrum from the single square. The dashed vertical lines represent theoretical resonances.

As will be recognized by one of ordinary skill in the art, FIGS. 4A-4D presents for reference all the same figures for this single square as was used with the earlier array of FIG. 3A. The data matches the predictions of the analytic formula Eq. 1 with the same shift as observed earlier. Comparison of FIG. 3D and FIG. 4D shows that the main difference in the fundamental absorption is the strength, which can be attributed to the difference in fill factor with the resonance itself resulting from the dimensions of the structure. The absence of a strong difference in the positions of the resonances for single square (FIG. 4D) and array of squares (FIG. 3D) suggests that the squares absorb independently with little interaction. Thus, only dimensions within a single unit cell, and not the period of any array of cells, is important in defining the resonance wavelength.

The illustrative structure depicted in FIG. 1 may be fabricated by the following exemplary procedure. In one embodiment, the disclosed invention may be micro-electro-mechanical system air-bridge type bolometer. Device fabrication starts with deposition and lift-off patterning of the conductive ground plane 16 on bare silicon or other substrate. Then the chosen first dielectric 18 is deposited over the whole wafer. Then, a metal with low thermal conductance (such as nickel-chrome 80/20) is deposited and lift-off patterned to create the structural arms and electrical connections or interconnects 26. Next, the high TCR material 20 is deposited and lift-off patterned. Then, a blanket coat of a second dielectric 22 is deposited to encapsulate, protect, and isolate the high TCR elements 20. Metal traces and bond pads are then deposited and patterned by lift-off, followed by patterned conductive absorbers on top of the pixels (conductive elements 24). The dielectrics are selectively co-etched to create vias to the substrate. Then the bolometer 12 is undercut using an isotropic fluorinated plasma etch in a barrel asher to form a trench in the substrate, which creates the air-bridge. Post-fabrication, the structure can be used as a detector device similar to more traditional bolometers.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A wavelength selective bolometer apparatus, the apparatus comprising:
    a substrate configured to serve as a foundation for the apparatus;
    a thermal isolation gap established between the substrate and subsequent solid material layers;
    a conducting ground plane layer disposed above the thermal isolation gap;
    a first dielectric layer mated to a top surface of the conducting ground plane;
    a temperature sensing material layer mated to a top surface of the first dielectric layer
    a plurality of interconnects in electrical communication with the temperature sensing material layer, and extending beyond a perimeter of the first dielectric layer;
    a second dielectric layer mated to a top surface of the temperature sensing material;
    at least one conductive element mated to a top surface of the second dielectric layer; and
    wherein the dimensions of the conductive element and a combined thickness of the first dielectric layer, the temperature sensing material layer, and the second dielectric layer are chosen to achieve resonant absorption of selected wavelengths of radiation incident thereupon.

2. The apparatus of claim 1, wherein the temperature sensing layer comprises a first high temperature coefficient of resistance (TCR) material.

3. The apparatus of claim 1, wherein the first dielectric layer and the second dielectric layer also comprise the temperature sensing material.

4. The apparatus of claim 2, wherein the temperature sensing layer includes a second high TCR material layer in contact with the first high TCR layer.

5. The apparatus of claim 1, wherein the first dielectric layer and the second dielectric layer are selected from the group consisting of silicon dioxide, hafnium dioxide, silicon nitride, titanium dioxide, and aluminum nitride.

6. The apparatus of claim 1 wherein each of the at least one conductive element and the conducting ground plane layer comprises material selected from the group consisting of metals, metal silicides, metal germanides, semimetals, semiconductors, conducting oxides, and conducting polymers.

7. The apparatus of claim 1, further including a plurality of conductive elements disposed on the top side of the second dielectric layer.

8. The apparatus of claim 7, wherein the plurality of conductive elements are disposed in a periodic or non-periodic geometric pattern.

9. The apparatus of claim 1, wherein the at least one conducting layer comprises a a periodic or non-periodic array of holes in an otherwise continuous layer.

10. The apparatus of claim 1, wherein the temperature sensing layer is $VO_x$, where x has a value between 1 and 2.

11. The apparatus of claim 10, wherein the temperature sensing layer further includes metallic nano-particles.

12. The apparatus of claim 1, wherein the temperature sensing layer is comprised of amorphous silicon.

13. The apparatus of claim 1, wherein the apparatus is a micro-electro-mechanical system air-bridge.

* * * * *